United States Patent [19]

Thompson

[11] Patent Number: 4,641,686
[45] Date of Patent: Feb. 10, 1987

[54] SOLENOID OPERATED VALVE PRESSURE BALANCED IN A CLOSED POSITION BY A SINGLE DIAPHRAGM

[76] Inventor: Phillip D. Thompson, P.O. Box 453 Blue Stone La., York, Me. 03909

[21] Appl. No.: 683,063

[22] Filed: Dec. 18, 1984

[51] Int. Cl.⁴ ..................... F16K 11/044; F16K 31/06
[52] U.S. Cl. ........................... 137/625.65; 137/625.27; 251/282; 251/129.15
[58] Field of Search ...................... 137/625.65, 625.27; 251/282, 129.15

[56] References Cited

U.S. PATENT DOCUMENTS

| | | |
|---|---|---|
| 1,153,681 | 9/1915 | Fulton . |
| 1,172,739 | 2/1916 | Roehrich . |
| 2,602,627 | 7/1952 | Britton . |
| 2,682,386 | 6/1954 | Lindsay . |
| 2,826,215 | 3/1958 | Wolfslau et al. . |
| 2,875,784 | 3/1959 | Cole . |
| 2,893,428 | 7/1959 | Collins . |
| 2,897,836 | 8/1959 | Peters et al. . |
| 2,934,090 | 4/1960 | Kenann et al. . |
| 3,063,469 | 11/1962 | Freeman . |
| 3,985,333 | 10/1976 | Paulsen . |
| 4,411,406 | 10/1983 | Inada et al. ................ 251/282 X |
| 4,442,998 | 4/1984 | Ohyama et al. ............. 251/282 X |

*Primary Examiner*—Arnold Rosenthal
*Attorney, Agent, or Firm*—Gregg I. Anderson

[57] ABSTRACT

A solenoid operated valve, including a balanced operating position when the valve is closed, is disclosed for use for handling pressurized air. The valve includes a valve body having an interior portion with at least one valve seat selectably contacted by a valve seal. The valve seal is mounted upon a longitudinally extending valve stem which is connected at one end to a diaphragm and at the other end slideably connected within the valve body itself. The diaphragm separates an interior portion of the valve into an inlet chamber and an expansion chamber. The valve seat separates the inlet chamber from an outlet chamber, the inlet chamber in communication with the air supply and the outlet chamber in communication with the air destination. The area of the valve seat is of equal area to the diaphragm. The outlet chamber and the expansion chamber are in air communication. When the valve seal is closed against the valve seat, the inlet chamber pressure acts on the valve seal and the diaphragm, which results in balanced forces resulting from their respective equal areas. The outlet pressure acts on the valve seal but is balanced by equal force in the opposite direction acting on the diaphragm. The valve can be modified to a three-way valve with an exhaust portion by including a second valve seat and providing air communication between the expansion chamber and atmospheric pressure.

4 Claims, 14 Drawing Figures

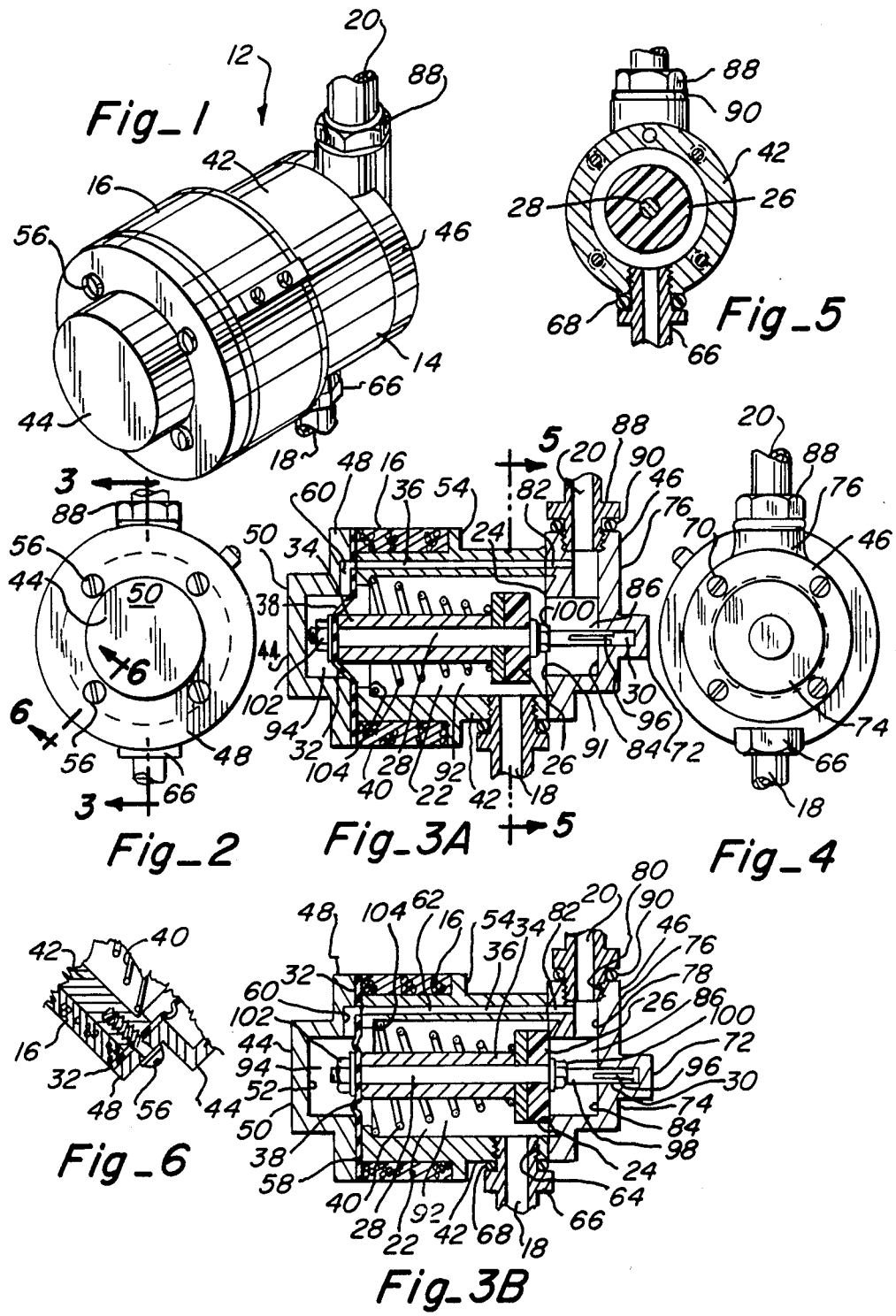

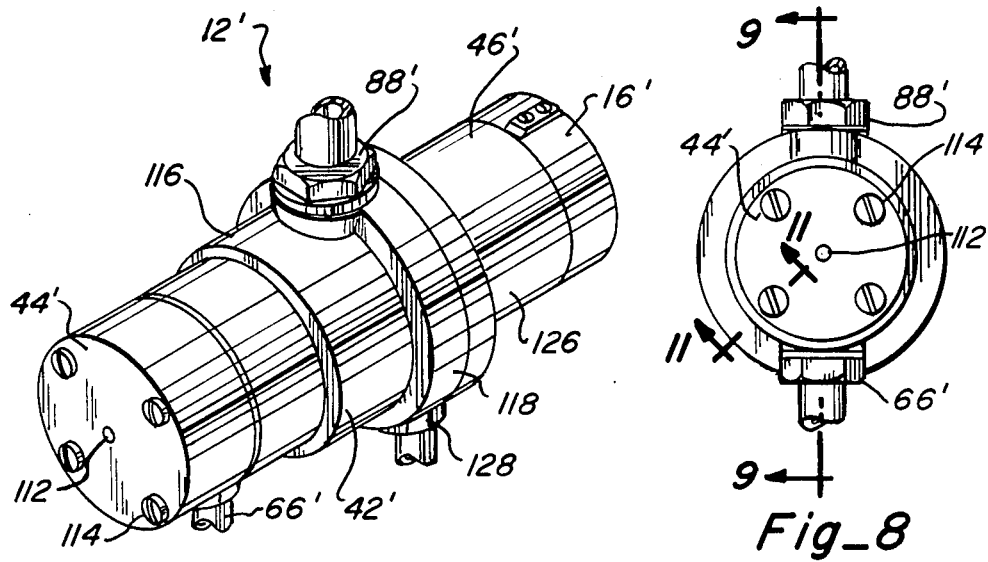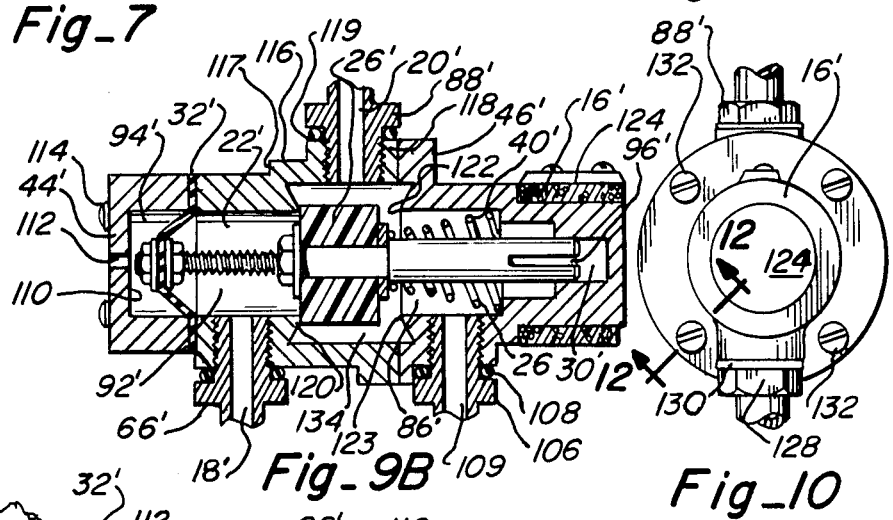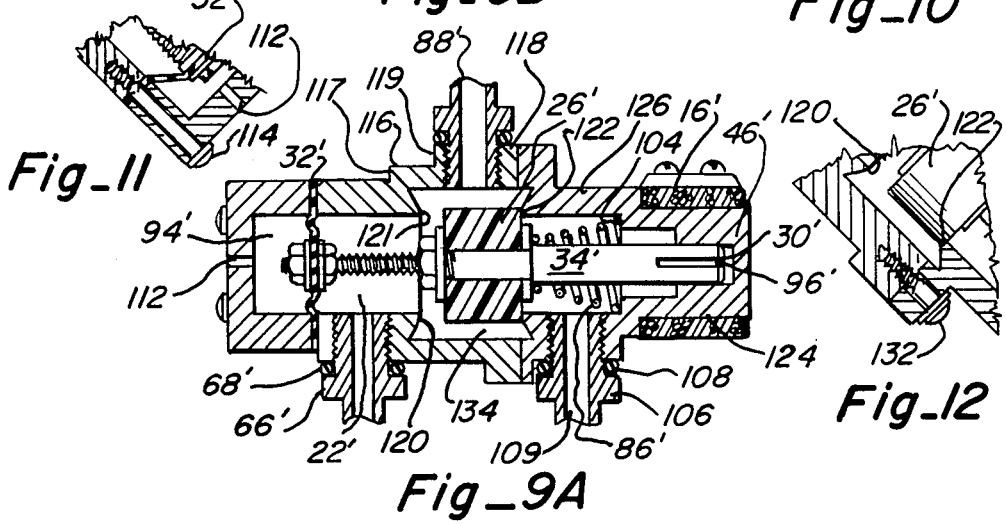

SOLENOID OPERATED VALVE PRESSURE BALANCED IN A CLOSED POSITION BY A SINGLE DIAPHRAGM

BACKGROUND OF THE INVENTION

1. Field of the Invention

The present invention relates to solenoid operated air flow control valves, the solenoid moving a valve seal from a valve seat. A passageway between an air supply and an air destination through the valve is opened or closed by movement of the valve seal. More particularly, the invention relates to valves wherein a valve stem carrying the valve seal thereon is formed of magnetic material and defines an armature upon which an electromagnetic field induced by the solenoid energizing a coil opens the valve. Such valves often include mechanisms including multiple diaphragms, pistons and the like for balancing the pressure within the valve tending to hold the valve seal in a closed position against the valve seat. The present invention is related to this type of valve to the extent that it is contemplated that the internal pressure of the valve is balanced to thereby minimize the electrical power necessary to move the valve stem armature and attached valve seal to open the valve.

2. Description of the Prior Art

Several prior art patent references show a solenoid operated valve including structure for balancing pressures within the valve to minimize the electrical power necessary to open or close the valve. A balanced valve using two diaphragms is seen in G. Paulsen, U.S. Pat. No. 3,985,333; G. Wolfslau et al, U.S. Pat. No. 2,826,215; and C. Cole, U.S. Pat. No. 2,875,784.

More specifically, the Paulsen patent reference shows two diaphragms, each of equal area to the valve seat area, the net force acting to open or close the valve being equal because the same pressure is acting on one of the diaphragms and the valve seat. Paulsen uses a coil to actuate a valve stem or armature made of magnetic material. The concept of Paulsen is to balance the pressure on an inlet side of the valve seat with one of the diaphragms and on an outlet side of the valve seat with the other of the diaphragms. Wolfslau et al also use two selectively positioned diaphragms, one on the outlet side and one on the inlet side of the valve seat. The armature of Wolfslau is not integral with the valve stem, but rather is slideable with respect thereto.

Cole is a three-way valve operated by a solenoid, two outlets are present in Cole, rather than the one of the two-way valves exemplified by Paulsen and Wolfslau. An integral stem of Cole connects a pair of valve heads or seals intermediate a pair of diaphragms also connected to the stem. The stem moves along a longitudinal axis of a valve body. One of the valve seats has a surface area equal to one of the diaphragms and is balanced with respect to one valve position. The other diaphragm associated with the other valve seat has a greater area than the corresponding valve seat and is used in conjunction with a supply of pressurized air to move the entire valve stem from a balanced configuration.

Other solenoid operated valves include balancing mechanisms other than diaphragms. J. Kenann, U.S. Pat. No. 2,934,090, uses two pistons in a three-way valve to obtain balanced operation. J. Collins, U.S. Pat. No. 2,893,428, uses a uniquely configured multiple surface valve spool in association with a piston to obtain balanced operation.

Manually or motor operated valves with balancing also include multiple structural components to achieve a balanced configuration in one or more valve positions. L. Lindsay, U.S. Pat. No. 2,682,386, utilizes a bellows in combination with a piston to balance a valve. C. Peters et al, U.S. Pat. No. 2,897,836, is a three-way valve utilizing a diaphragm and piston to achieve a balanced valve. M. Freeman, U.S. Pat. No. 3,063,469 utilizes two separate diaphragms, as well as additional structure to obtain a balanced operating mode.

The problem presented by many of the references is one of simplicity and ease of operation. For example, the patent to Lindsay is a three-way valve wherein the internal pressure in a bellows is balanced with a diaphragm-like arrangement. The valve seat area in Lindsay is not balanced by any equal area structure, though patents such as Paulsen, even though including two diaphragms, do balance by equaling the valve seat area to a diaphragm area. Many of the patent references, for example Paulsen, use a multiple component balancing structure to obtain a valve balanced in the closed position. To open the valve, a solenoid needs to overcome a spring force. It is the nature of Paulsen, as well as Wolfslau, to balance forces either side of the valve seat, in both the open and closed valve positions, by using the two diaphragms.

A manually actuated valve that uses a single deformable structure connected to a valve stem operably connected to a valve seal, which structure achieves balanced operation is seen in W. Fulton, U.S. Pat. No. 1,153,681. The diameter of the bellows structure in Fulton is essentially the same as the valve seat diameter, and the effective areas are therefore equal. The downstream or outlet side of the valve is placed in communication with an outer surface of the bellows, resulting in balanced forces on the area of the valve seal circumscribed by the valve seat. Compressing the bellows through use of a valve lever decreases its effective diameter and resulting force applied to the valve seal, helping reduce the force necessary to move the valve to the open position. Fulton does show the concept of communicating the outlet or downstream pressure of a valve seat with the inlet side which has deformable structure to establish a balanced operating position.

OBJECTS AND SUMMARY OF THE INVENTION

It is the principal object of the invention to provide a balanced solenoid operated valve in which the valve is balanced in a closed position by equating the force tending to hold a valve seal against a valve seat to the force tending to push the valve seal away from the valve seat.

It is a related object of the present invention to provide a balanced solenoid operated valve utilizing a spring to hold the valve seal against the valve seat in the balanced, closed position.

It is a further related object of the present invention to provide a balanced solenoid operated valve with a minimum number of parts.

It is another object of the present invention to provide a balanced solenoid operated valve which operates with a minimum of friction.

It is still another object of the present invention to provide a balanced solenoid operated valve wherein no moving parts pass through a body of the valve, greatly enhancing the ability of the valve to remain sealed against leakage.

In accordance with the objects of the invention, a valve is constructed from a valve body having an inlet in fluid communication with an air supply and an outlet in fluid communication with an air destination. The inlet of the valve body is in further fluid communication with an interior portion of the valve body. An inlet chamber of the interior portion is separated by a valve seat from an exhaust or outlet chamber of the interior portion, which exhaust or outlet chamber is in fluid communication with the outlet of the valve, and hence the air destination.

The valve closure structure includes a valve seal operably connected to a longitudinally extending valve stem, which valve stem extends from the exhaust chamber to the inlet chamber. The valve stem is slidingly received within a stem bore of the body at one end, the other end being operably connected to a diaphragm having the same surface area as the area of the valve seal circumscribed by the valve seat, referred to hereinafter as the valve seat area.

The diaphragm separates an expansion chamber of the interior portion from the inlet chamber. The expansion chamber is in pressure or fluid communication with the outlet chamber to equalize the pressure in the expansion chamber and outlet chambers.

In the closed valve position, the forces on the valve seal are the pressure of the inlet chamber acting on the valve seal and on the diaphragm, and the outlet pressure acting on the valve seal and, in the expansion chamber, on the diaphragm. The pressure in the inlet chamber results in no net movement because of the equal areas of the diaphragm and valve seal as circumscribed by the valve seat. The outlet pressure force is balanced by the equal areas of the diaphragm and valve seal area. No net force is therefore acting to move the valve seal from the valve seat.

The stem also includes a jacket of iron cladding or other magnetic material which acts as an armature operated by a coil of the solenoid. A spring within the interior portion of the valve biases the valve seal agains the valve seat in the balanced closed position. Actuation of the solenoid creates a current in the coil which electromagnetically acts on the armature to overcome the spring biased force, allowing fluid communication between the inlet and outlet chambers by moving the valve seal away from the valve seat.

The invention also includes an embodiment wherein a three-way valve, or two-way valve with an exhaust outlet to atmosphere, is shown. In the three-way embodiment, the valve seal is movable between two valve seats. In the closed valve position, the areas of the diaphragm and valve seal as circumscribed by the valve seat are equal. Inlet pressure produces no net force tending to open the valve. The expansion chamber is vented to the atmosphere and thus communicates with the outlet, which exhausts to atmospheric pressure. The three-way valve is opened by energizing the coil to overcome the spring force.

DESCRIPTION OF THE DRAWINGS

FIG. 1 is a perspective view of a first embodiment of a balanced solenoid operated valve of the invention.

FIG. 2 is an end view of the invention shown in FIG. 1.

FIG. 3a is a sectional view taken in the plane of line 3—3 of FIG. 2, a valve seal being shown displaced from a valve seat to open the valve.

FIG. 3b is a view similar to FIG. 3a, the valve seal being shown secured against the valve seat.

FIG. 4 is a second end view of the invention shown in FIG. 1.

FIG. 5 is a sectional view taken in the plane of line 5—5 of FIG.3a.

FIG. 6 is a fragmentary sectional view taken in the plane of line 6—6 of FIG. 2.

FIG. 7 is a perspective view of a second alternative embodiment of the invention.

FIG. 8 is an end view of the invention shown in FIG. 7.

FIG. 9a is a sectional view taken in the plane of line 4—4 of FIG. 8, a valve seal being shown displaced from a valve seal to open the valve.

FIG. 9b is a view similar to FIG. 9a, the valve seal being shown secured against the valve seat.

FIG. 10 is a second end view of the invention shown in FIG. 7.

FIG. 11 is a fragmentary sectional view taken in the plane of line 11—11 of FIG. 8.

FIG. 12 is a fragmentary sectional view taken in the plane of line 12—12 of FIG. 10.

DESCRIPTION OF THE PREFERRRED EMBODIMENTS

In drawing FIGS. 1 through 6, a solenoid operated valve 12 is shown as having a valve body 14 about which is wound a coil 16 actuated by a solenoid and power supply (not shown). The valve 12 is connected at an inlet 18 to an air supply and at an outlet 20 to an air destination, neither the supply nor the destination being shown.

The valve body 14 defines an interior portion 22 therewithin. The interior portion 22 receives air from the air supply through the inlet 18 and allows passage of air from the valve 12, upon actuation of coil 16, to the air destination. The interior portion includes a valve seat 24 intermediate the inlet 18 and outlet 20. A valve seal 26 is selectively abuttable against the valve seat 24 to interrupt the flow of air from the air supply to the air destination, opening or closing the valve 12.

The valve seal 26 is secured to a valve stem 28 slidable within the interior portion 22, the stem 28 slideably connected at one end within a stem bore 30, formed in the valve body 14 adjacent the interior portion 22, and connected at a second end to a flexible diaphragm 32. The stem is directly operated by the coil 16 upon energization of the same by solenoid and power supply, the stem including for this purpose an armature or outer casing 34 of ferrous material, like iron.

During operation, the valve 12 is balanced by reason of the area of the valve seal 26 circumscribed by the valve seat 24, the valve seat area, being equal to the area of the diaphragm 32. A return passageway 36 is formed through the valve body 14 providing communication between the outlet 20 and an expansion side 38 of the diaphragm 32. The pressure at the outlet acts on the area of the expansion side of the diaphragm 32 moving the stem 28, and thereby the valve seal 26 against the valve seat 24. Simultaneously, the outlet pressure tends to push the valve seal to an open position, off the valve seat 24, this force balanced by the outlet pressure acting on the expansion side of the diaphragm. The equal areas of the diaphragm and valve seat result in virtually no net force acting to move the stem 28 and valve seal 26 from the valve seat 24. In the closed position, the valve 12 is held shut by biasing means, including a coil spring 40 of sufficiently high spring force to hold the valve seal 26 against the valve seat 24. The power necessary to overcome the spring force is on the order of 0.5 watts.

The valve body 14 can be made of lightweight plastic material and includes a main body 42 of generally hollow cylindrical configuration, a substantial portion of the interior portion 22 of the valve 12 encompassed thereby, a diaphragm end cap 44 secured to one end of the main body 42, and an exhaust or outlet end cap 46 secured to another end of the main body 42. The main body includes approximately at a midpoint along its length, an integral peripheral flange 54 extending completely around the circumference of the body (FIGS. 3a and 3b).

The diaphragm end cap 44 is integrally formed of a cylindrical portion 50 having a centrally formed relatively short counterbore 52 and an integral flange 48 extending circumferentially away from the cylindrical portion. The diaphragm end cap is connected as by screws 56 (FIGS. 2 and 6) to the main body 42, a circular periphery of the diaphragm 32 secured therebetween and defining a seal between those two parts. The circular flange 54 projects away from the main body 42 the same extent as does the peripheral flange 48 so that the coil 16 can be wound about the main body between the flanges 48 and 54. The cylindrical portion 50 of the end cap 44 also includes a channel 60 which extends radially away from the counterbore 52 a relatively short distance along the circular flange 54 and is formed in a surface of the cap 44 adjacent the connection to the main body 42.

In connecting the diaphragm end cap 44 to the main body 42, the channel 60 is aligned with a bore 62 extending longitudinally through the main body 42. The channel 60 and bore 62 forming a portion of the return passageway 36. The main body 42 also includes a transverse threaded bore 64, defining the inlet 18. An inlet fitting 66 is threadably received by the transverse threaded bore 64, an O-ring seal 68 being secured therebetween. The inlet fitting connects through hosing, piping or other tubing to the air supply.

The exhaust end cap 46 is attached to the main body 42 as by screws 70 to complete the body 14. The exhaust end cap 46 is cast or otherwise integrally formed to include at one longitudinal extent thereof a cylindrical stem bore portion 72 concentric with the longitudinal axis of the interior portion 22. The stem bore 30 is formed interiorly of the stem bore portion 72. An end portion 74 is circularly concentric with the stem bore portion 72 and has projecting thereabove a cylindrical connection portion 76 oriented transversely to the longitudinal axis of the main body 42 and having a bore 78 formed therealong. The bore 78 has internal threads 80 to threadably connect to an outlet fitting 88, an O-ring seal 90 secured therebetween. The outlet fitting 88 is in air communication with the air destination, the bore 78 defining a portion of the outlet 20 of the valve 12. A second bore 82 is formed in the connection portion 76 transverse to the first bore 78 for alignment and connection with the bore 62 of the main body 42.

The channel 60, bores 62 and 82 together define the return passageway 36, providing equal pressure between an outlet chamber 86 and an expansion chamber 94, as will be hereinafter discussed. A second counterbore 84 formed in the end cap 46 communicates with both the stem bore 30 and the bore 78, the three of which together define the outlet chamber 86.

The second counterbore 84 terminates at the connection between the main body 42 and the exhaust end cap 46. The valve seat 24 is defined at this interface by an edge 91 projecting circumferentially from the counterbore 84 toward the valve seal 26. The valve seat area circumscribed by the edge 91 is equal to the diaphragm area. When the valve seal 26 contacts the edge 91, the area of the seal circumscribed by the edge is the valve seat area on which the inlet and outlet pressures act, resulting in a force balanced by the force from the same pressure acting on the diaphragm area.

An inlet chamber 92 begins at the valve seat 24 and includes the interior portion 22 of the main body 42 from the edge 91 to the diaphragm 32, at the connection between the main body 42 and diaphragm end cap 44. The inlet 18 is in communication with the inlet chamber 92. An expansion chamber 94 is defined primarily by the counterbore 52 on the expansion side 38 of the diaphragm 32.

At the outlet side of the valve seat 24 in the outlet chamber 86, the valve stem 28 is slidably received within the stem bore 30, as previously discussed. At the slidable connection between the valve stem 28 and the stem bore 30, the stem has formed thereon an exterior surface groove 96 extending parallel to a longitudinal axis of the stem. This groove 96 is sufficiently long to relieve pressure from the stem bore as the stem slides therewithin, minimizing forces that might otherwise have to be overcome in slideably moving the stem 28 within the bore 30.

As seen in FIGS. 3a and 3b, the valve seal 26 is of cylindrical configuration and is secured in a conventional manner about the valve stem 28 by a nut 100. The valve seal is made of rubber or other resilient sealing material. The armature 34 is also secured conventionally to the valve stem 28, extending intermediate the valve seal 26 and the diaphragm 32. The valve stem 28 projects through the diaphragm 32, the diaphragm 32 secured to the stem by a second nut 102 defining a threadable connection between the diaphragm and valve stem, which threadable connection is centered on the longitudinal axis of the valve 12.

The interior portion 22 at the inlet chamber 92 includes a peripheral ledge 104. One end of the coil spring 40 rests on the peripheral ledge, the armature 34 and valve stem 28 being concentric thereto, and the spring 40 at a second end abuts against one surface of the valve seal 26, biasing the valve seal against the valve seat 24 in the balanced closed position. As is seen, the outlet chamber 86 is in communication with the expansion chamber 94 through the return passageway 36.

When the valve 12 is closed, air supply pressure fills the inlet chamber 92 through inlet fitting 66, and the diaphragm 32 and the valve seat 24 area, circumscribing the valve seal, are equal areas. The force against the valve seal is equal to the force against the diaphragm in the inlet chamber. The end result is no net movement of the valve stem and valve seal. The pressure in the outlet chamber 86 is equal to the pressure at the air destination. That pressure acting on the circumscribed valve seat area is balanced by that same pressure acting on the same area of the diaphragm 32, pressure equalized by the return passageway 36 which provides communication to the expansion chamber 94 from the outlet chamber 86.

The valve 12 is opened by actuation of the solenoid to energize the coil 17, power required being only on the order of 0.5 watts. The armature moves the entire valve stem 28 along the stem bore 30 and away from the valve seat 24 under the influence of the magnetic field of the energized coil 17. The seal 26 assumes the position of FIG. 3a and establishes a flow path or passageway between the air supply and the air destination.

In an alternative three-way embodiment of the valve 12', like parts being given the same number with a prime suffix, when the valve 12' is closed, the air destination communicates through an exhaust 109 to atmosphere. An exhaust fitting 106 secures an O-ring seal 108 intermediate the exhaust fitting and the end cap 46' (FIGS. 7 through 12).

The end cap 44' is cylindrical, having a counterbore 110 and an exhaust port 112 to atmosphere formed therein. Screws 114 secure the diaphragm end cap 44' to the main body 42'.

The main body 42' has a threadable connection for the inlet fitting 66', which is sealed by the 0-ring seal 68'. The main body 42' also includes a relatively larger integral cylindrical portion 116 and a still larger integral mating portion 118 of cylindrical configuration defining two steps 117 and 119, respectively, along the length of the main body portion 42'. The mating portion 118 threadably receives the outlet fitting 88' and is secured to the outlet end cap 46'.

Two valve seats 120 and 122 are formed in the valve 12', valve seat 12 is formed interiorly of the main body 42' and includes an edge 121 projecting toward the connection between the outlet cap 46' and the main body 42'. The valve seat 122 has an edge 123 formed in the outlet cap 46', which edge 123 projects toward the connection between the diaphram end cap 44' and the main body 42'. The valve seal 26' is movable between the valve seats 120 and 122. When mated against valve seat 120, the valve 12' is closed and the air destination exhausts to atmosphere. When the valve seal 26' is mated against valve seat 122, the air supply charges the air destination and the valve 12' is open.

The outlet end cap 46' includes a land portion 124 at an extremity thereof. The coil 16' is wound about the land portion. A relatively larger diameter intermediate cylindrical portion 126 of the outlet end cap 46 receives the exhaust fitting 106 threadably therein securing the O-ring seal 108 to the cap 46'. The exhaust fitting 106 communicates with atmospheric pressure. The end cap 46' is connected as by screws 132 to the main body portion 42', as seen in FIG. 12.

The interior portion 22' includes the counterbore 110 of the end cap 44', the inlet chamber 92' defined interiorly of the main body portion 42', the outlet chamber 86' defined interiorly of the end cap 46' and an intermediate chamber 134 formed within the main body portion 42' between the inlet and outlet chambers and adjacent to the outlet 20'. The coil spring 40' is biased against the valve seal 26' from the peripheral ledge 104' positioned in the outlet chamber 86', rather than in the inlet chamber 84', as was the case in the first embodiment.

The outer casing 34' is circumscribed by the spring 40'. The casing 34' and stem 28' are slideable in the stem bore 30' and are influenced to move by the coil 16' in the same manner as the first described embodiment.

As seen in FIG. 9b, inasmuch as the exhaust is to the atmosphere through the exhaust fitting 128, the exhaust port 112 of the expansion chamber 94' is in communication therewith by reason of also exhausting to the atmosphere. Accordingly, in the closed position seen in FIG. 9b, the inlet pressure balanced, as was the case in the first described embodiment and atmospheric pressure is used to balance the diaphragm 32' and valve seal 26' circumscribed by the valve seat 120. The inlet pressure force is balanced in the same manner as previously described for the first embodiment. Atmospheric pressure force is balanced, as was the outlet pressure in the first embodiment. Actuation of the solenoid energizes the coil 16' to open the valve 12' permitting the air supply to charge the air destination.

Although the invention has been described with a certain degree of particularity, the scope of the invention is more specifically shown in the appended claims.

What is claimed is:

1. A solenoid operated balanced valve for controlling the flow of air under pressure between an air supply and an air destination, comprising in combination:

a body having an inlet chamber and an outlet chamber formed interiorly thereof, said inlet chamber in air communication with said air supply and said outlet chamber in communication with said air destination, a valve seal mounted on a valve stem slideable within said body, said valve seal movable between two valve seats positioned either side thereof and formed within said body, a closed position of said valve defined when said valve seal is mated against said valve seat adjacent said inlet chamber and an open position defined within said valve seal is mated against said valve seat in said outlet chamber, said outlet chamber further having an exhaust formed through said valve body communicating with atmospheric pressure, said valve stem being connected at another end to a diaphragm separating said inlet chamber from an expansion chamber, said diaphragm being of equal area to the area of the valve seal circumscribed by the one valve seat, said expansion chamber in communication with atmosphere through a port formed through said valve body, said expansion chamber in communication with said exhaust and said outlet chamber when the valve is in the closed position, and biasing means for urging said valve seal against said first valve seat when said valve is in a closed position, forces acting to open said valve from said closed position being equal by reason of equal areas of diaphragm and valve seal circumscribed by the first valve seat.

2. A balanced valve for controlling the flow of pressurized air from an air supply to an air destination comprising in combination:

a valve body including an inlet chamber in air communication with the air supply and at least one valve seat integrally formed within said valve body, said body further including an outlet chamber adjacent said inlet chamber and in air communication with the air destination, an axially aligned stem guide bore extending longitudinally away from said outlet chamber into said body, a valve stem connected at one end to a single diaphragm of preestablished surface area, said valve stem slideable within said stem guide bore and including a longitudinally extending groove formed therein to permit said slideable connection without interference from air trapped between said stem guide bore and said stem, and a valve seal connected to said valve stem and selectively contacting said valve seat, said valve seat having an area equal to the area of said diaphragm, said diaphragm connected to said valve body and extending across said inlet chamber separating said inlet chamber from an expansion chamber, said expansion chamber in air communication through a passageway formed through said body with the outlet chamber when the valve seal is closed against one of said valve seats, said valve seal sealably abuttable against said one valve seat on one surface and on an opposite surface in continous contact with one end of biasing means for urging said one valve seal into sealing contact with said valve seat, said stem being magnetically operated by a coil connected to said body, whereby activation of the coil operates to move the stem and valve seal against the biasing means and move said seal from said one valve seat to allow pressurized air from said air supply to reach the air destination, the pressure force in the inlet chamber balanced by reason of the equal areas of the diaphragmn and the valve seat, the pressure force acting on the expansion side of the diaphragm balanced against the equal pressure force in the outlet chamber acting on the valve seal so long as the valve is closed.

3. The invention as defined in claim 2 wherein there are two valve seats and said valve seal selectively moveable therebetween, in the closed position, said valve seal preventing said air supply from reaching said air destination and said outlet being in communication with atmospheric pressure, said expansion chamber communicating with atmospheric pressure through said passageway formed through said body and said biasing means positioned within said outlet chamber.

4. A solenoid operated balanced valve for controlling the flow of air under pressure between an air supply and an air destination, comprising in combination:

a body having an inlet chamber and an outlet chamber formed interiorly thereof, said inlet chamber in air communication with said air supply and said outlet chamber in communication with said air destination, two valve seats one adjacent said inlet chamber and one adjacent said outlet chamber, a valve seal selectively matable against each of said valve seats, said valve seal mounted on an elongated stem made of magnetic material and connected at one end to a diaphragm, said diaphragm separating said inlet chamber from an expansion chamber formed in said body, said diaphragm further being of equal area to the area of the valve seat, said stem further slideable at another end in a stem guide bore formed within said body and adjacent said outlet chamber, said expansion chamber in communication with an exhaust port through a passageway, said exhaust port further in communication with atmospheric pressure as the air destination is provided a flow path to the atmospheric pressure through said valve, and biasing means for urging said valve seal against said valve seat when said valve is in a closed position, forces acting to open or close said valve being balanced by equal pressures acting on equal areas within the inlet chamber, the outlet chamber and the expansion chamber.

* * * * *